(12) United States Patent
Kleveland (10) Patent No.: US 6,486,728 B2
(45) Date of Patent: Nov. 26, 2002

(54) MULTI-STAGE CHARGE PUMP

(75) Inventor: Bendik Kleveland, Los Altos, CA (US)

(73) Assignee: Matrix Semiconductor, Inc., Santa Clara, CA (US)

( * ) Notice: Subject to any disclaimer, the term of this patent is extended or adjusted under 35 U.S.C. 154(b) by 0 days.

(21) Appl. No.: 09/809,878

(22) Filed: Mar. 16, 2001

(65) Prior Publication Data

US 2002/0130701 A1 Sep. 19, 2002

(51) Int. Cl.[7] .................................................. G05F 3/02
(52) U.S. Cl. ........................ 327/536; 327/390; 327/539
(58) Field of Search ................................. 327/536, 534, 327/390, 539, 598, 590; 323/312, 313, 314

(56) References Cited

U.S. PATENT DOCUMENTS

| | | | |
|---|---|---|---|
| 5,216,588 A | 6/1993 | Bajwa et al. | 336/60 |
| 5,357,216 A | 10/1994 | Nguyen | 331/25 |
| 5,553,030 A | 9/1996 | Tedrow et al. | 365/226 |
| 5,627,739 A | 5/1997 | Yung-Chow et al. | 363/60 |
| 5,635,776 A | 6/1997 | Imi | 307/110 |
| 5,680,300 A | 10/1997 | Szepesi et al. | 363/59 |
| 5,781,473 A | 7/1998 | Javanifard et al. | 365/185.18 |
| 5,801,987 A | 9/1998 | Dinh | 365/185.18 |
| 5,912,552 A | 6/1999 | Tateishi | 323/258 |
| 5,994,885 A | 11/1999 | Wilcox et al. | 323/258 |
| 6,157,242 A | * 12/2000 | Fukui | 327/536 |
| 6,255,896 B1 | * 7/2001 | Li et al. | 327/536 |

* cited by examiner

Primary Examiner—Tuan T. Lam
Assistant Examiner—Hiep Nguyen
(74) Attorney, Agent, or Firm—Brinks Hofer Gilson & Lione (57) ABSTRACT

An integrated voltage source includes a charge pump having multiple charge pump stages connected in series. A first one of the these charge pump stages is connected to the high voltage output of the charge pump, and the remaining charge pump stages are coupled to this first charge pump stage in a manner such that substantially all the charge pumped by all of the additional charge pump stages is also pumped by the first charge pump stage. In one mode of operation, the first charge pump stage and at least one additional charge pump stage are enabled. In another mode of operation, the first charge pump stage and at least two additional charge pump stages are enabled. A control circuit determines the mode of operation and, therefore, the number of charge pump stages that are enabled.

11 Claims, 5 Drawing Sheets

MULTI-STAGE CHARGE PUMP

BACKGROUND

The present invention relates to multi-stage charge pumps suitable for use with integrated circuit applications.

Charge pumps and DC-to-DC converters have been used in the past in integrated circuit applications. See, for example, U.S. Pat. Nos. 5,781,473, 5,801,987, 5,553,030 and 5,216,588.

The charge pump described in U.S. Pat. No. 5,781,473 is a multi-stage charge pump, and the output of each of the stages is connected directly to the high voltage output of the charge pump. The charge pump stages can be configured to operate in parallel or in series, depending upon the state of various switches in the system.

The charge pump described in U.S. Pat. No. 5,801,987 is also a multiple stage charge pump in which one, two, three or four of the stages can be enabled. In the illustrated system, the outputs of all of the charge pump stages are connected to the output of the charge pump via respective diodes. These diodes bring with them the disadvantage of a voltage drop across the diode even when the diode is conductive.

SUMMARY

By way of general introduction, the charge pumps described below are multiple stage charge pumps that are connected in series, with stage one directly connected to the high voltage output of the charge pump and stages two and three and progressively farther from the high voltage output of the charge pump. The charge pump stages are selectively enabled such that if charge pump stage m is enabled, then all charge pumps stages m−1, . . . 1 are enabled. Depending upon the required output voltage, more or fewer of the charge pumps stages are enabled. This can be accomplished with a preprogrammed control circuit, or alternatively with an adaptive control circuit that responds to the output voltage of the charge pump. The embodiments described below are relatively easy to implement, and they avoid diode drops in the chain of series-connected charge pump stages.

This section has been provided by way of general introduction, and it should not be used to narrow the scope of the following claims.

DETAILED DESCRIPTION OF THE PRESENTLY PREFERRED EMBODIMENTS

Figure 1:
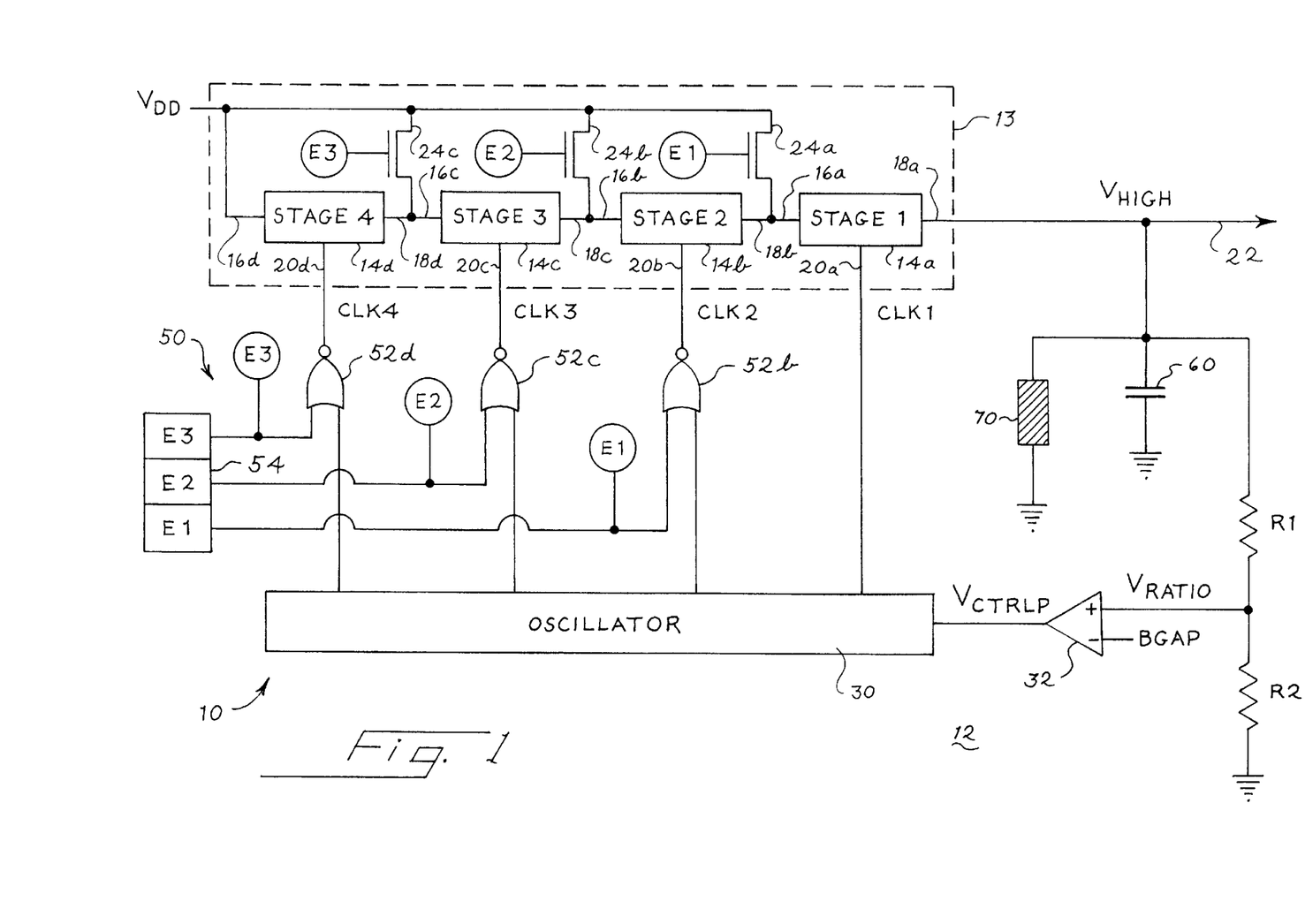
FIG. 1 is a block diagram of a charge pump and an associated oscillator that incorporate a first preferred embodiment of this invention.

Turning now to the drawings, the voltage source 10 of FIG. 1 is formed on an integrated circuit substrate 12 that can, for example, be a conventional silicon die. The voltage source 10 can, for example, be used to convert a 3-volt supply voltage $V_{DD}$ to a 10-volt output voltage as appropriate for use in programming an anti-fuse in a solid-state memory.

The voltage source 10 includes a charge pump 13 that in turn includes a set of series-connected charge pump stages 14a–14d. In this embodiment, the supply voltage $V_{DD}$ is applied to the lower voltage input of the charge pump 13, and one, two, three, or all four of the stages 14a–14d pump charge from the lower voltage input to the higher voltage output 22.

Each stage includes a respective lower voltage input 16a–16d, and a respective higher voltage output 18a–18d. Each stage 14a–14d operates to pump a unit of charge from its respective lower voltage input 16a–16d to its respective higher voltage output 18a–18d with each transition of the clock signal applied to the respective clock input 20a–20d.

As shown in FIG. 1, the higher voltage output 18a of the first stage 14a is connected to a high voltage output 22 of the charge pump 13. The higher voltage outputs 18b, 18c, 18d are directly connected to the lower voltage inputs 16a, 16b, 16c, respectively, such that the charge pump stages 14a–14d are series connected. Additionally, each of the lower voltage inputs 16a–16d is connected to the supply voltage $V_{DD}$. Switches 24a–24c, when open, isolate the respective lower voltage inputs 16a–16c from the supply voltage $V_{DD}$.

Figure 1A:
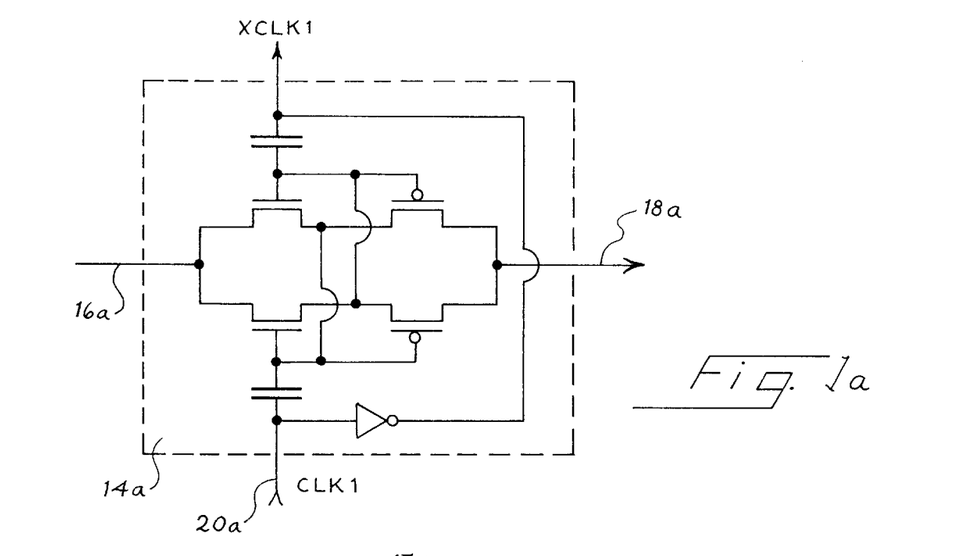
FIG. 1a is a schematic diagram of one of the charge pump stages 14a of FIG. 1.

FIG. 1a is a schematic diagram of a charge pump stage which can be used for all of the stages 14a–14d of FIG. 1. The following U.S. patents provide other examples of the types of charge pumps that readily can be adapted for use in the voltage source of FIG. 1:

U.S. Pat. No. 5,978,283
U.S. Pat. No. 5,432,469
U.S. Pat. No. 5,635,776
U.S. Pat. No. 5,734,290

P. Fabrat, P. Deval, M. J. Declercq, "A high-efficiency CMOS voltage doubler," IEEE Journal of Solid-Stage Circuits, vol. 33, no. 3, March 1998.

The rate at which charge is pumped by the charge pump 13 and the voltage to which it is pumped are controlled by an oscillator 30 and a control circuit 50. In the embodiment of FIG. 1, the oscillator 30 generates five evenly spaced clock phases, and four of these five clock phases are applied to respective ones of the stages 14a–14d as clock signals CLK1, CLK2, CLK3, and CLK4. The phase difference between the clock signals for each of the stages 14a–14d is ⅖ per half cycle, which is close to the ideal 90° separation. Using more stages in the oscillator 30 allows closer to the optimal 90° spacing if desired.

In this embodiment, the oscillator 30 is a voltage controlled oscillator. The frequency of oscillation of the oscillator 30 is controlled by a control signal $V_{CTRLP}$ generated by differential amplifier 32. The inverting input of the differential amplifier 32 is held at a reference voltage BGAP, while the nonverting input of the amplifier 32 is coupled with a voltage divider that includes resistor R1, R2 connected between the high voltage output 22 and ground. A decoupling capacitor 60 is also connected to the high voltage output 22 in parallel with the voltage divider. Current drawn from the voltage source 10 is indicated schematically by the load 70, also connected to the high voltage output 22.

In this case, the target parameter used to control the frequency of the oscillator 30 is not the frequency of the oscillator 30, but rather the output voltage of the voltage source 10. The feedback loop including the amplifier 32 adjusts the frequency of the oscillator 30 to maintain a constant output voltage with low ripple for current loads that vary by several orders of magnitude.

The oscillator 30 responds to the control signal $V_{CTRLP}$ to alter the oscillation frequency as appropriate to maintain the voltage of the output 22 at the desired level. In particular, when the voltage $V_{RATIO}$ falls below BGAP, the frequency of oscillation of the oscillator 30 is increased, thereby increasing the rate at which charge is pumped to the capacitor 70. Conversely, when the voltage $V_{RATIO}$ rises above the reference BGAP, the oscillator 30 reduces the frequency of oscillation of the clock signals, thereby lowering the rate at which charge is pumped to the capacitor 70.

The differential amplifier 32 is one example of a feedback element, though many other approaches are possible. The feedback element may operate continuously or in a clocked manner, and it may include an amplifier (such as a differential amplifier) or another element that compares the signal $V_{RATIO}$ to a reference, as for example, a subtracting element.

Figure 1B:
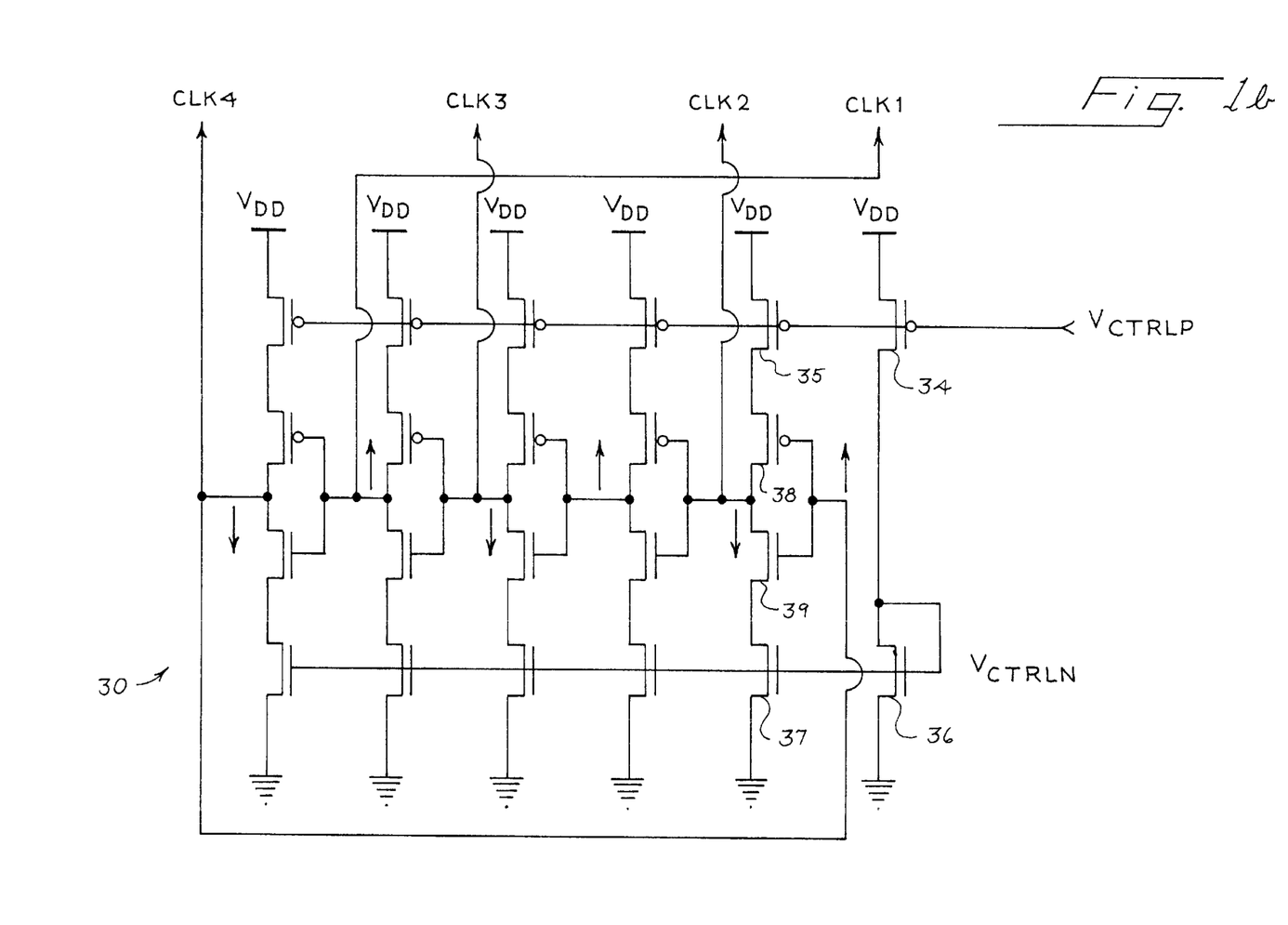
FIG. 1b is a schematic diagram of the oscillator of FIG. 1.

FIG. 1b provides a circuit diagram of one embodiment of the oscillator 30, though it should clearly be understood that many alternatives are possible. See, for example, the oscillators described in the following U.S. U.S. Pat. Nos. 4,859,968; 5,994,968; and 6,104,254.

In the example of FIG. 1b, the control voltage $V_{CTRLP}$ is applied to FET 34 that controls the current passing through five FET's, one of which is labeled with the reference symbol 35. FET 34 is coupled with a second FET 36 that controls the current passing through five FETs, one of which is designated with the reference symbol 37. The oscillator 30 includes five inverters, one of which includes the FET's 38, 39. Each inverter is characterized by a delay period that varies as a function of the state of conduction of the associated FET's 35, 37.

The control circuit 50 of FIG. 1 operates to enable selected ones of the stages 14b–14d. The control circuit 50 includes NOR gates 52b, 52c, 52d as well as a programmable register 54 that stores three control parameters E1, E2, E3. For example, the register 54 may be programmed during fabrication or during operation to set the logic state of the parameters E1–E3. Logic signals generated in response to the stored parameters of the register 54 are also applied to the switches 24a, 24b, 24c, as shown in FIG. 1.

When the stored parameters E1, E2 and E3 are all in the logic low state, all four stages 14a–14d are enabled, yielding the highest output voltage. Note that in this mode of operation the switches 24a, 24b, 24c are in the open-circuit state, and all of the charge pumped by the stage 14d is also pumped by the stages 14c, 14b, and 14a. Similarly, all of the charge pumped by the stage 14c is also pumped by the stages 14b and 14a, and all of the charge pumped by the stage 14b is pumped by the stage 14a.

In another mode of operation, the stored parameter E3 is in the logic high state and the stored parameters E1 and E2 are in the logic low state. In this mode of operation, the stage 14d is disabled, while the stages 14a, 14b, and 14c are enabled. The switches 24a, 24b are in the open-circuit state, and the switch 24c is in the closed-circuit state. In this mode of operation, charge pumped from $V_{DD}$ to the high voltage output 22 is pumped to a lesser voltage in an efficient manner.

In a third mode of operation, stored parameters E3, E2 are in the logic high state and stored parameter E1 is in the logic low state. In this mode the stages 14d and 14c are disabled while the stages 14b and 14a are enabled.

The switch 24a is in the open-circuit condition, while the switches 24b and 24c are in the closed-circuit condition. In this mode of operation, charge is pumped successively through only two stages 14a, 14b before being supplied to the high voltage output 22 of the charge pump 13.

In a fourth mode of operation, all three of the stored parameters E1, E2, E3 are in the logic high state, and only the stage 14a is enabled. The switch 24a is in the closed-circuit state, and charge passes through only a single stage 14a before being delivered to the high voltage output 22.

Thus, the control circuit 50 can be used to alter the number of stages 14a–14d that are activated in order to optimize charge pump efficiency for a given voltage and current target. The ratio R1/R2 and the band gap voltage BGAP set the voltage level $V_{HIGH}$ of the voltage source without any external components off the substrate 12. All of the components of FIG. 1 (except perhaps for the load 22) are built on the same integrated circuit substrate 12, and no external components are required to achieve a low ripple voltage. The control method implemented by the circuit of FIG. 1 provides a particularly efficient way of altering the number of stages operating to pump charge at any time, because it avoids the need for diodes and the associated diode or transistor voltage drops of certain prior-art devices.

The phases of the clock signals of the adjacent charge pump stages are chosen to achieve approximately a 90° phase offset between adjacent stages, thereby optimizing efficiency. The exact phase is not critical, and elaborate clock drivers used to insure non-overlapping clock signals are not required. This further simplifies layout, since the routing of the clock phases is not critical and can be done with minimum pitch to reduce layout and power requirements.

The register 54 may be rewriteable, in which case the parameters E1, E2, E3 can be changed in accordance with operating conditions. Alternatively, the register 54 may be a write-once register, in which case the parameters E1, E2, E3 may be set at or after the time of circuit fabrication.

Figure 2:
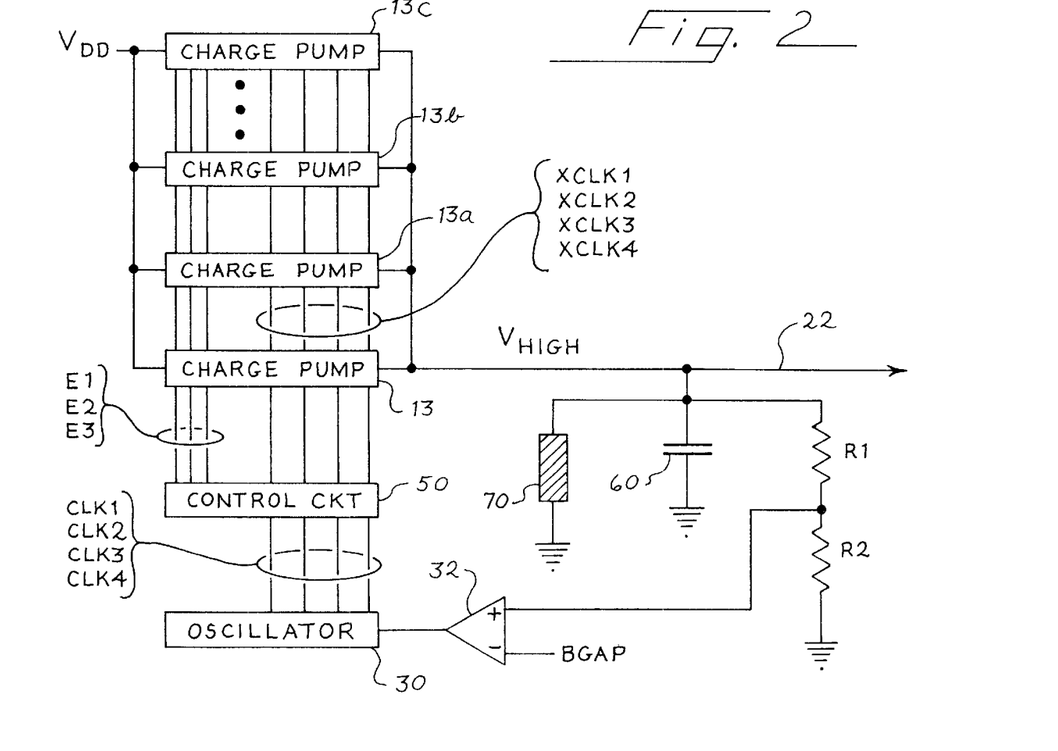
FIG. 2 is a block diagram of a charge pump and an associated oscillator that incorporate a second preferred embodiment of this invention.

FIG. 2 shows an alternative embodiment of this invention that operates similarly to the embodiment of FIG. 1. Is in this case, multiple charge pumps 13, 13a, 13b, 13c are provided, all connected in parallel to the high voltage output 22. The use of multiple, parallel charge pumps further reduces ripple voltages at the high voltage output 22. The various charge pumps can be driven in parallel, or alternatively the clock phases can be inverted between adjacent charge pumps or buffered within each charge pump. Inverting or buffering the clock signals in each charge pump reduces the peak-to-average current drawn from the power supply, which reduces noise and improves efficiency. In FIG. 2 the charge pumps 13, 13a, 13b, 13c are connected in parallel, and clock and enable lines are cascaded to reduce the load on each clock enable line and thereby to simplify layout.

Figure 3:
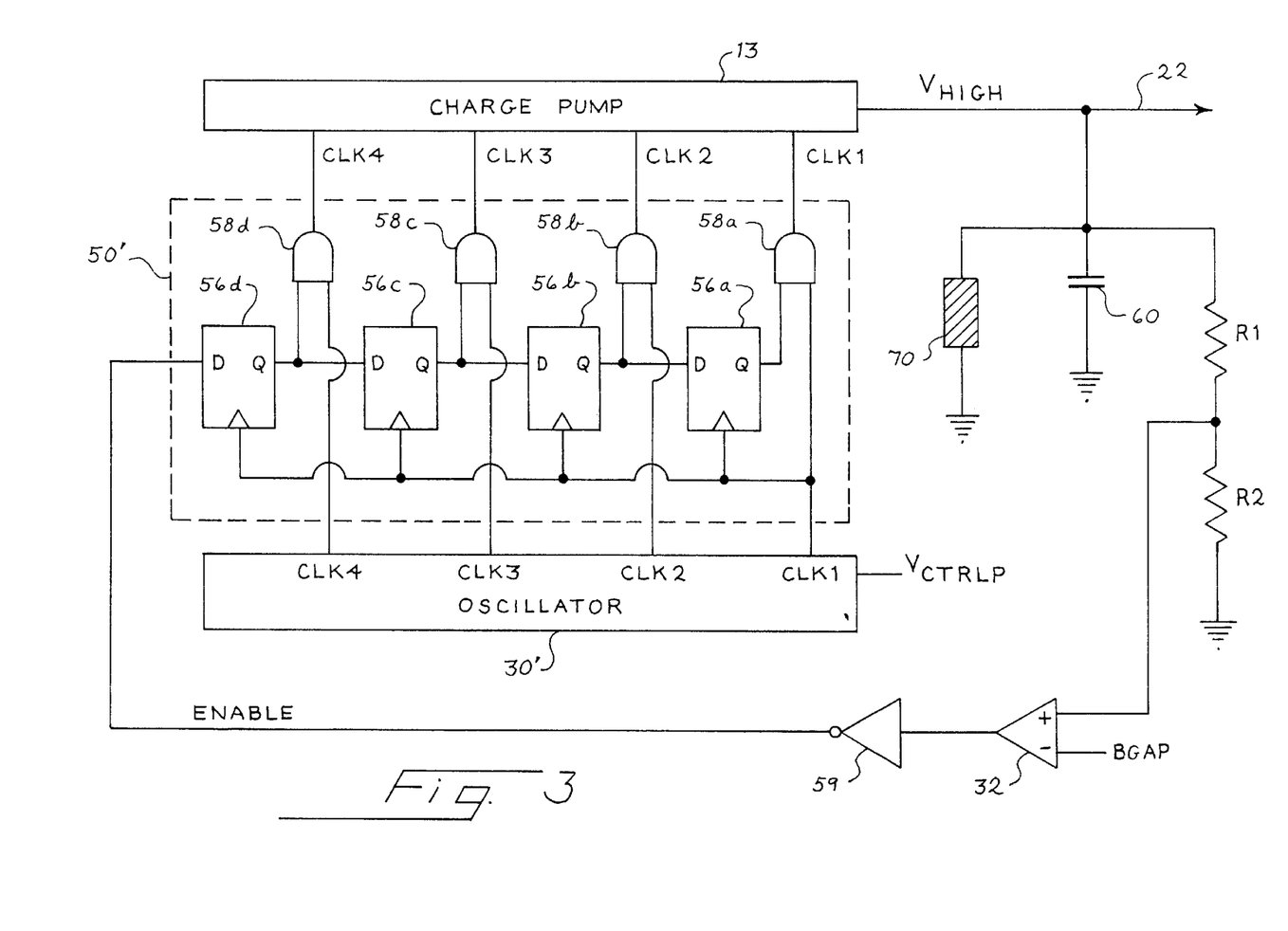
FIG. 3 is a block diagram of a charge pump, an oscillator, and a control circuit that incorporate a third preferred embodiment of this invention.

It is not essential in all embodiments that the charge pump of this invention be used in combination with a voltage controlled oscillator. In the embodiment of FIG. 3, the oscillator 30' is similar to the oscillator 30 described above, except that the control voltage $V_{CTRLP}$ is maintained at a constant level. In this case, the control circuit 50' is implemented as four flip flops 56a–56d and four associated AND gates 58a–58d. Each of the flip flops 56a–56d includes a respective clock input connected to CLK1, a respective D input and a respective Q output. The D input of the flip flop 56d is controlled by an inverter 59 coupled to the output of the amplifier 32.

In this case the amplifier 32 functions as a simple on/off comparator. Depending upon the voltage on the high voltage output 22, the output of the amplifier 32 is either high or low. In particular, when the voltage on the high voltage output 22 exceeds a first threshold, the output of the amplifier 32 is high and the enable signal applied to the D input of the flip flops 56d is low.

This enable signal is latched and cascaded via flip flops 56c, 56b, 56d to progressively disable the clock signals CLK4, CLK3, CLK2, CLK1 in the stated order. This progressively reduces the voltage of charge pumped by the charge pump 13, eventually resulting in a reduction in the voltage $V_{HIGH}$ at the output 22. When the voltage $V_{HIGH}$ falls below a second threshold (which may be the same as or different from the first threshold), the output of the amplifier 32 goes low, and the enable signal applied to the D input of the flip flop 56d goes high. This high state of the enable signal is latched and cascaded as described above to progressively enable all four stages of the charge pump 13.

Figure 4:
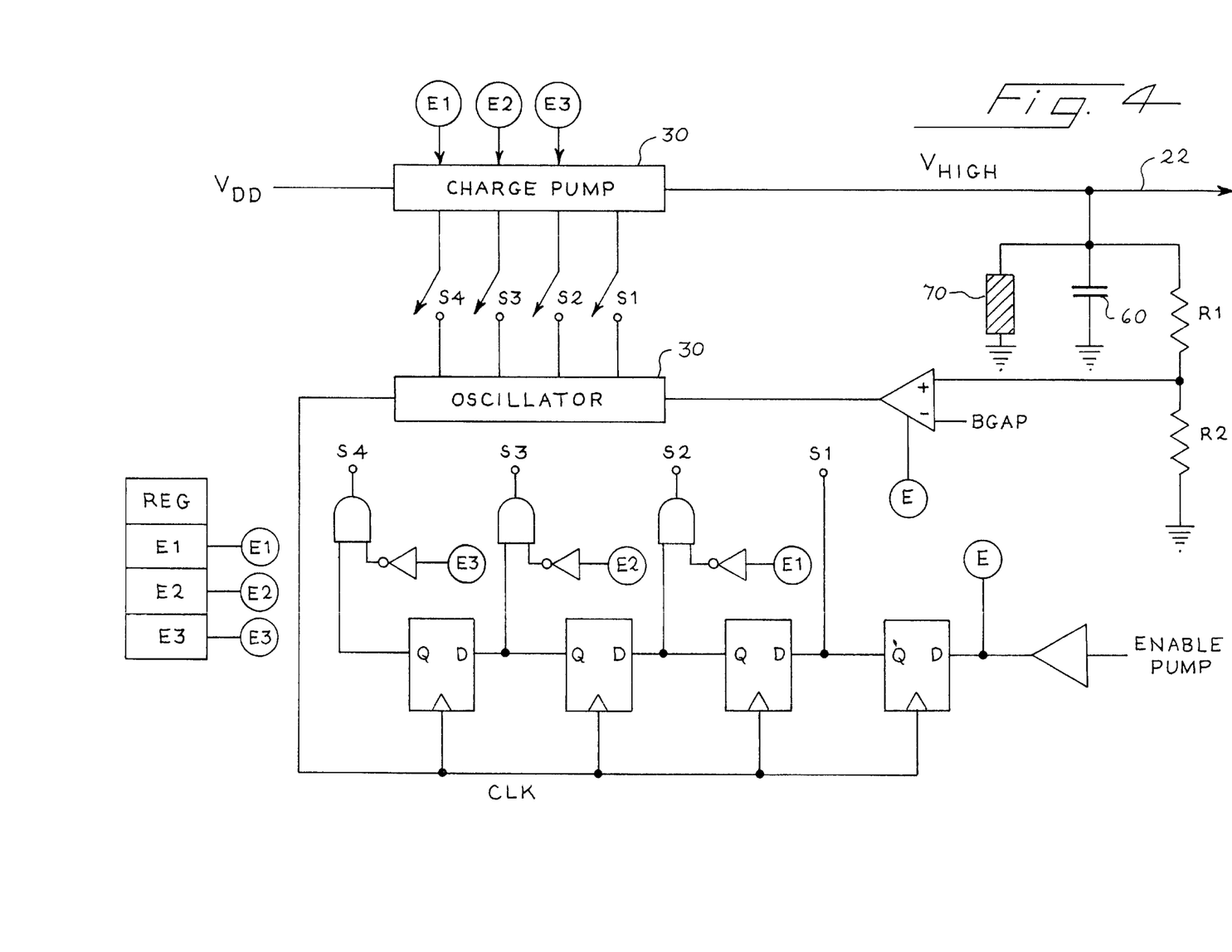
FIG. 4 is a block diagram of a fourth embodiment of this invention.

FIG. 4 shows a fourth embodiment which combines features of the embodiments of FIGS. 1 and 3 described above. In this case, a voltage controlled oscillator is used to vary the clock frequency as a function of the output $V_{HIGH}$, and the charge pump enable signal cascades through a series of flip flops.

The embodiments described above allow more or fewer of the stages to be enabled, depending upon voltage and current requirements. In one mode of operation, a smaller number of stages starting with stage 14a is enabled, as for example when the output voltage $V_{HIGH}$ exceeds the first threshold or when the parameters E1–E3 are in a first programmed state. During a time period characterized by increased current or voltage requirements, a larger number of stages is enabled, again beginning with the stage 14a. This can be appropriate for example when the output voltage $V_{HIGH}$ is less than a second threshold or when the parameters E1–E3 are in a second programmed state.

Of course, many alternatives are possible to the preferred embodiments described above. The number of charge pump stages can be varied widely, and it can include two, three, four or more. In general, the use of more charge pumps in parallel will lower the voltage ripple. The delay element used in the oscillator can also be varied widely. The illustrated delay element has the advantage of not consuming DC power so that a frequency proportional to the output load is easily achieved. The resistors R1, R2 can be implemented as switched capacitor resistors to reduce the power further as the frequency is reduced. A wide variety of charge pump constructions can be used, though the illustrated differential charge pump provides the advantage of reduced ripple.

The integrated charge pumps described above provide the advantage of low output ripple voltage for a wide range load currents, small charge storage devices such as a decoupling capacitor that can readily be placed on the substrate, efficient operation over a wide range of current loads and a small peak-to-average current drawn from the power supply.

As used herein, the term "coupled with" is intended broadly to refer to elements that are coupled together directly or indirectly. Thus, first and second elements are said to be coupled with one another, whether or not a third, unnamed element is interposed between the first and second elements.

The term "set" is used to indicate one or more.

The term "clock signal" is used to indicate a set of clock signals. Thus, the clock signal applied to each charge pump stage may include one, two, or more separate signals.

The terms "enable" as applied to a charge pump stage is intended broadly to encompass any suitable method for selectively allowing a charge pump stage to pump charge, as for example by turning on a clock signal and/or by connecting the charge pump stage to a charge source.

The foregoing detailed description has described only a few of the many forms that this invention can take. This detailed description is therefore intended only by way of illustration, and not limitation. It is only the following claims, including all the equivalents, that are intended to define the scope of this invention.

What is claimed is:

1. A charge pump comprising a lower voltage input and a higher voltage output, the charge pump comprising:
   a first charge pump stage comprising a first voltage input, a first voltage output, and a first clock input;
   a second charge pump stage comprising a second voltage input, a second voltage output, and a second clock input;
   each charge pump stage operative to pump charge from the respective voltage input to the respective voltage output in response to transitions of a respective clock signal applied to the respective clock input;
   said first voltage input connected to the second voltage output, and said first voltage output connected to the higher voltage output of the charge pump such that substantially all charge pumped by the second charge pump stage that reaches the higher voltage output is also pumped by the first charge pump stage;
   a control circuit operative to enable the first charge pump stage in a first mode of operation and to enable both the first and second charge pump stages in a second mode of operation;
   wherein a voltage of the higher voltage output of the charge pump is greater in the second mode than in the first mode.

2. A charge pump comprising a lower voltage input and a higher voltage output, the charge pump comprising:
   a plurality of N charge pump stages comprising stage 1, stage 2, . . . stage N, where N is an integer $\geq 3$, each stage comprising a respective voltage input, a respective voltage output, and a respective clock input; each stage operative to pump charge from the respective voltage input to the respective voltage output in response to transitions of a respective clock signal applied to the respective clock input;
   said N stages connected in series with the voltage output of stage 1 connected to the higher voltage output of the charge pump, and with the voltage output of each stage n connected to the voltage input of the stage (n−1) for all $2 \leq n \leq N$, such that substantially all charge pumped by stages 2 through N that reaches the higher voltage output is also pumped by stage 1;
   a control circuit operative to enable selected ones of the stages in a plurality of modes of operation, said plurality of modes comprising a first mode in which stages 1 through m are all enabled and stage (m+1) is disabled, a second mode in which stages 1 through k are all enabled, where my k, N>m$\geq$2, and k$\geq$3.

3. The invention of claim 1 or 2 further comprising:
   an oscillator coupled with the higher voltage output of the charge pump, said oscillator operative to generate the clock signals at a frequency that varies in response to a voltage of the higher voltage output.

4. The invention of claim 3 wherein the oscillator is operative to reduce the frequency of the clock signals when the voltage at the higher voltage output exceeds a selected value.

5. The invention of claim 3 further comprising a differential amplifier coupled between the oscillator and the higher voltage output of the change pump.

6. The invention of claim 1 or 2 wherein the control circuit is responsive to a voltage on the higher voltage output.

7. The invention of claim 1 or 2 further comprising a differential amplifier coupled between the control circuit and the higher voltage output of the charge pump.

8. A method of operating a charge pump, comprising a lower voltage input and a higher voltage output, the method comprising:

(a) providing a charge pump comprising a plurality of N charge pump stages comprising stage 1, stage 2, ... stage N, where N is an integer $\geq 3$, each stage comprising a respective voltage input, a respective voltage output, and a respective clock input; each stage operative to pump charge from the respective voltage input to the respective voltage output in response to transitions of a respective clock signal applied to the respective clock input, said N stages connected in series with the voltage output of stage 1 connected to the higher voltage output of the charge pump, and with the voltage output of each stage n connected to the voltage input of the stage (n−1) for all $2 \leq n \leq N$;

(b) selectively enabling stages 1 through m and not stage (m+1) during a first time period; and (c) selectively enabling stages 1 through k, where k>m, during a second time period; wherein a voltage of the higher voltage output of the charge pump is greater during the second time period than during the first time period.

9. The method of claim 8 further comprising:

(d) implementing (b) after a voltage on the higher voltage output of the charge pump exceeds a first threshold value; and (e) implementing (c) after the voltage on the higher voltage output of the charge pump falls below a second threshold value.

10. The method of claim 8 further comprising:

(d) implementing (b) in response to a first programmed state of a control circuit; and (e) implementing (c) in response to a second programmed state of the control circuit.

11. The invention of claim 2, wherein a voltage of the higher voltage output of the charge pump is greater in the second mode than in the first mode.

* * * * *

UNITED STATES PATENT AND TRADEMARK OFFICE
CERTIFICATE OF CORRECTION

PATENT NO. : 6,486,728 B2
DATED : November 26, 2002
INVENTOR(S) : Bendik Kleveland It is certified that error appears in the above-identified patent and that said Letters Patent is hereby corrected as shown below:

Column 6,
Line 55, delete "my k," and substitute -- $m \neq k$, -- in its place.

Signed and Sealed this

Nineteenth Day of August, 2003

JAMES E. ROGAN
*Director of the United States Patent and Trademark Office*